US008226507B2

(12) United States Patent
Uchiyama

(10) Patent No.: US 8,226,507 B2
(45) Date of Patent: Jul. 24, 2012

(54) CONTROL DEVICE FOR CONTINUOUSLY VARIABLE TRANSMISSION

(75) Inventor: Hirokazu Uchiyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 613 days.

(21) Appl. No.: 12/004,041

(22) Filed: Dec. 20, 2007

(65) Prior Publication Data

US 2008/0153665 A1 Jun. 26, 2008

(30) Foreign Application Priority Data

Dec. 21, 2006 (JP) ................................. 2006-343778

(51) Int. Cl.
 *F16H 61/662* (2006.01)
 *G06F 7/00* (2006.01)
 *G06F 17/00* (2006.01)
 *G06F 19/00* (2011.01)
(52) U.S. Cl. .......................................... 474/49; 701/51
(58) Field of Classification Search .................... 474/49, 474/70, 80; 701/51, 60, 62
 See application file for complete search history.

(56) References Cited

U.S. PATENT DOCUMENTS 5,131,297 A 7/1992 Yamashita et al.
6,090,000 A * 7/2000 Senger ............................ 474/18
6,443,871 B2 * 9/2002 Taniguchi et al. ............. 477/44
6,513,610 B2 * 2/2003 Ochiai et al. ................. 180/176
2003/0105574 A1 * 6/2003 Ino et al. ........................ 701/93
2010/0057316 A1 * 3/2010 Tanaka et al. ................ 701/61

FOREIGN PATENT DOCUMENTS

JP 3-249464 11/1991
JP 3596447 9/2004

* cited by examiner

*Primary Examiner* — Michael Mansen
*Assistant Examiner* — Robert Reese
(74) *Attorney, Agent, or Firm* — Smith, Gambrell & Russell, LLP

(57) ABSTRACT

An object of the present invention is to avoid unnecessary accumulation of a correction value during feedback control, even when a secondary pressure control valve enters a state of failure. A continuously variable transmission comprises a primary pulley supplied with a primary pressure that has been adjusted via a primary pressure control valve, a secondary pulley supplied with a secondary pressure that has been adjusted via the secondary pressure control valve, and a drive belt wound around the two pulleys. When a failure such as a disconnection occurs in the secondary pressure control valve, a lower limit value Imin of a target gear ratio is raised to a low side by a CVT control unit, and a setting region of the target gear ratio is set in a low region in which control is possible even during a failure. In so doing, divergence between the target gear ratio and an actual gear ratio can be avoided, and therefore unnecessary accumulation of the correction value during feedback control can be avoided.

12 Claims, 10 Drawing Sheets

(A) Normal (Target Gear Ratio i ≒ Actual Gear Ration i' )

(B) Failure (Target Gear Ratio I << Actual Gear Ration i' )

CONTROL DEVICE FOR CONTINUOUSLY VARIABLE TRANSMISSION

CROSS-REFERENCE TO RELATED APPLICATION

The disclosure of Japanese Patent Application No. 2006-343778 filed on Dec. 21, 2006 including the specification, drawings and abstract is incorporated herein by reference in its entirety.

BACKGROUND OF THE INVENTION

1. Field of the Invention

The present invention relates to a control device for a continuously variable transmission installed in a vehicle.

2. Description of the Related Art

A belt type continuously variable transmission (CVT) incorporated into a power transmission system of a vehicle comprises a primary pulley provided on an input shaft, a secondary pulley provided on an output shaft, and a drive belt wound around the pulleys, and controls a gear ratio continuously by varying the winding diameter of the drive belt relative to the pulleys. The primary pulley and secondary pulley each comprise a fixed sheave and a movable sheave facing the fixed sheave, and by moving the movable sheave axially, the winding diameter and tension of the drive belt can be controlled.

For example, to control the tension of the drive belt using the secondary pulley, a target secondary pressure is calculated on the basis of a target gear ratio and an input torque, and a secondary pressure that has been adjusted toward the target value is supplied to the secondary pulley. To control the winding diameter of the drive belt using the primary pulley, a target gear ratio is set on the basis of a throttle opening, a vehicle speed, and so on, and a hydraulic ratio between the primary pressure and secondary pressure that corresponds to the target gear ratio is set. A target primary pressure is then set on the basis of the hydraulic ratio and the aforementioned target secondary pressure, whereupon a primary pressure that has been adjusted to the target value is supplied toward the primary pulley.

To adjust the primary pressure and secondary pressure in this manner, a hydraulic control circuit is provided with a primary pressure control valve for adjusting the primary pressure and a secondary pressure control valve for adjusting the secondary pressure, and control signals based on running conditions are output to these control valves from an electronic control unit. In particular, a control signal that has been subjected to feedback control on the basis of a deviation between the target gear ratio and an actual gear ratio is output to the primary pressure control valve for adjusting the primary pressure in order to cause the actual gear ratio to converge with the target gear ratio.

An integral correction value calculated through integration processing is typically used during this feedback control. However, the integral correction value accumulates when the target gear ratio and actual gear ratio do not match, and as a result the responsiveness of speed change control may deteriorate. To avoid this situation, a control device that prohibits integration processing when the target gear ratio is set on an overdrive side below a lower limit gear ratio and when the target gear ratio is set a low side higher than an upper limit gear ratio has been proposed (see Japanese Unexamined Patent Application Publication H3-249464, for example). Further, a control device that avoids unnecessary accumulation of the integral correction value by setting an upper limit on the integral correction value accumulation amount and resets the integral correction value when the deviation between the target gear ratio and actual gear ratio shifts to a reverse symbol has also been proposed (see Japanese Patent Publication No. 3596447, for example).

The primary pressure control valve and secondary pressure control valve are controlled on the basis of control signals from the electronic control unit, but a failsafe function is incorporated into the control circuit so that a minimum running performance can be secured while maintaining running safety even when a state of failure occurs due to disconnection of the control valves or the like such that control cannot be performed. If the supply of oil pressure from the primary pressure control valve and secondary pressure control valve were to be halted during a failure, for example, slippage would occur in the drive belt and so on, making control of the vehicle impossible, and therefore a valve structure allowing output of the maximum primary pressure and secondary pressure during a failure is employed.

However, when a large secondary pressure is output from the secondary pressure control valve during a failure, the hydraulic ratio between the primary pressure and secondary pressure shifts, and as a result, the minimum gear ratio of the continuously variable gear ratio is raised to the low side. In other words, when the secondary pressure control valve enters a state of failure, excessive secondary pressure is output, and as a result, the speed change region in which control can be performed is limited to a predetermined region on the low side.

When the secondary pressure control valve enters a state of failure on the overdrive side, the target gear ratio and actual gear ratio diverge greatly such that when an attempt is made to bring the low side actual gear ratio close to the overdrive side target gear ratio, the aforementioned integral correction value accumulates unnecessarily on an upshift side. When a downshift command is output under these conditions, a downshift operation of the continuously variable transmission is essentially halted until the integral correction value that has accumulated on the upshift side is expended, and as a result, responsiveness during speed change control deteriorates. Furthermore, when a downshift is executed during an emergency stop while the integral correction value is in an accumulated state, the vehicle may stop before the downshift to a low state is complete, and therefore, due to a lack of drive power, it may be difficult to restart the vehicle.

SUMMARY OF THE INVENTION

An object of the present invention is to avoid unnecessary accumulation of a correction value during feedback control, even when a tightening control valve enters a state of failure.

A control device for a continuously variable transmission according to the present invention is a control device for a continuously variable transmission having a speed change pulley and a tightening pulley around which a power transmission element is wound, comprising: a speed change control valve provided between a hydraulic supply source and the speed change pulley for adjusting a speed change control pressure supplied to the speed change pulley; a tightening control valve provided between the hydraulic supply source and the tightening pulley for adjusting a tightening control pressure supplied to the tightening pulley; target gear ratio setting means for setting a target gear ratio on the basis of a running condition; actual gear ratio calculating means for calculating an actual gear ratio on the basis of a rotation speed of the speed change pulley and the tightening pulley; feedback control means for feedback-controlling the speed change control pressure on the basis of a deviation between the target gear ratio and the actual gear ratio; failure detecting means for detecting failure of the tightening control valve; and speed change region setting means for limiting a setting region of the target gear ratio during failure of the tightening control valve.

In the control device for a continuously variable transmission according to the present invention, the speed change pulley is a primary pulley provided on an input shaft, the tightening pulley is a secondary pulley provided on an output shaft, and the speed change region setting means raise a lower limit value of the target gear ratio to a speed reduction side during failure of the tightening control valve.

The control device for a continuously variable transmission according to the present invention further comprises rotation speed setting means for lowering an upper limit value of a target primary rotation speed during failure of the tightening control valve.

In the control device for a continuously variable transmission according to the present invention, the target gear ratio setting means comprise a normal speed change map used when the tightening control valve is in a normal state, and a failure speed change map used during failure of the tightening control valve.

In the control device for a continuously variable transmission according to the present invention, the tightening control valve outputs a maximum tightening control pressure during failure.

The control device for a continuously variable transmission according to the present invention further comprises speed change speed limiting means for limiting a speed change speed during failure of the tightening control valve.

In the control device for a continuously variable transmission according to the present invention, the speed change speed limiting means limit the speed change speed in accordance with a vehicle speed.

According to the present invention, the setting region of the target gear ratio is limited during failure of the tightening control valve, and therefore divergence between the target gear ratio and the actual gear ratio can be eliminated, and unnecessary accumulation of a correction value used during feedback control can be prevented. Hence, even when the tightening control valve enters a state of failure, responsiveness during speed change control can be ensured, and an adequate starting performance after the vehicle stops can be secured.

DESCRIPTION OF THE PREFERRED EMBODIMENT

An embodiment of the present invention will be described in detail below on the basis of the drawings.

Figure 1:
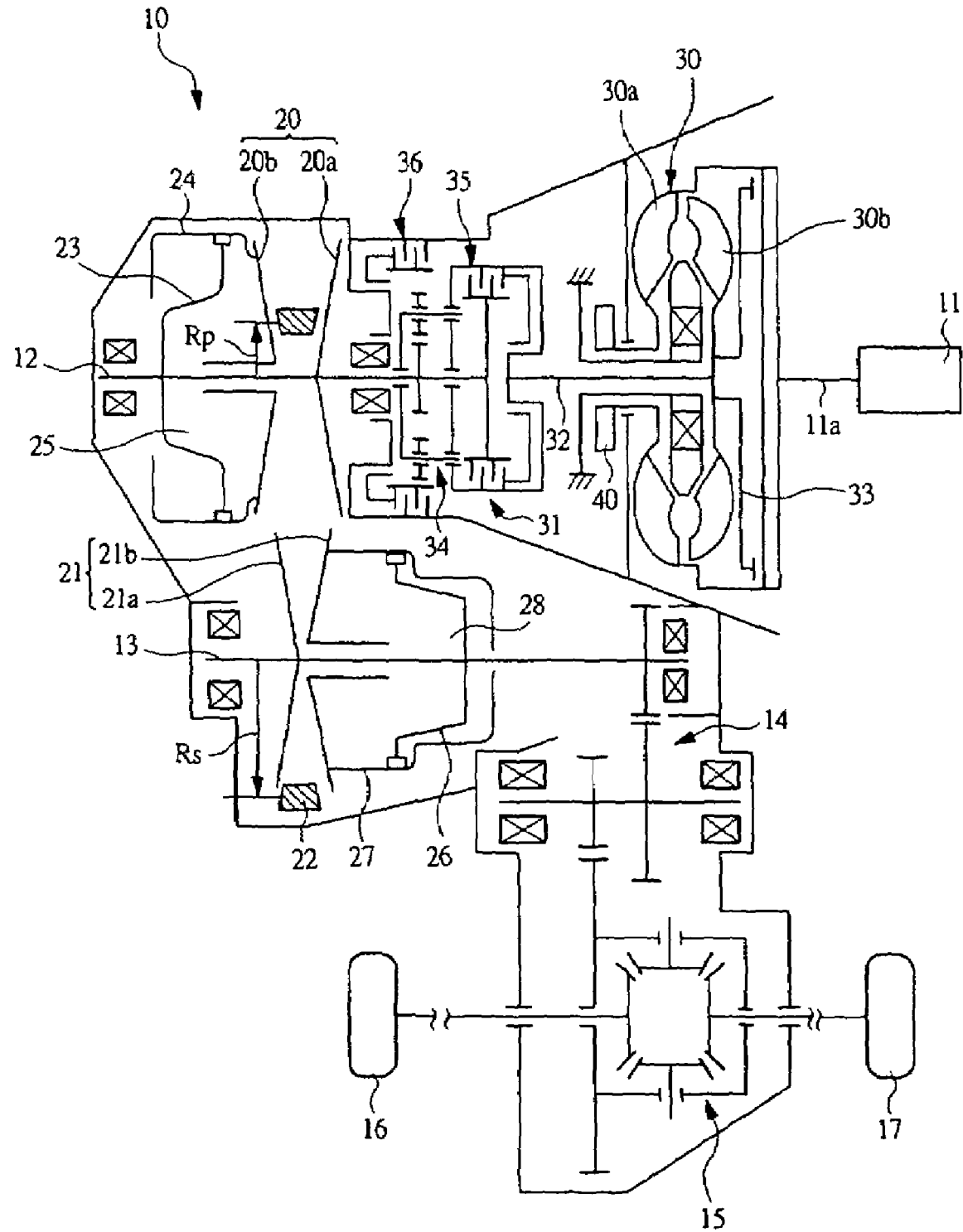
FIG. 1 is a skeleton diagram showing a continuously variable transmission incorporated into a power transmission system of a vehicle.

FIG. 1 is a skeleton diagram showing a continuously variable transmission 10 incorporated into a power transmission system of a vehicle. As shown in FIG. 1, the continuously variable transmission 10 is a belt type continuously variable transmission comprising a primary shaft 12 serving as an input shaft driven by an engine 11, and a secondary shaft 13 serving as an output shaft which is parallel to the primary shaft 12. A speed change mechanism is provided between the primary shaft 12 and secondary shaft 13 such that the rotation of the primary shaft 12 is shifted in speed and transmitted to the secondary shaft 13. The rotation of the secondary shaft 13 is then transmitted to left and right drive wheels 16, 17 via a speed-reducing mechanism 14 and a differential mechanism 15.

A primary pulley 20 serving as a speed change pulley is provided on the primary shaft 12, and the primary pulley 20 comprises a fixed sheave 20a formed integrally with the primary shaft 12, and a movable sheave 20b opposing the fixed sheave 20a and fitted onto the primary shaft 12 so as to be free to slide axially. A secondary pulley 21 serving as a tightening pulley is provided on the secondary shaft 13, and the secondary pulley 21 comprises a fixed sheave 21a formed integrally with the secondary shaft 13, and a movable sheave 21b opposing the fixed sheave 21a and fitted onto the secondary shaft 13 so as to be free to slide axially.

A drive belt 22 serving as a power transmission element is wound around the primary pulley 20 and secondary pulley 21, and by varying the groove width of the primary pulley 20 and secondary pulley 21 so that the winding diameter of the drive belt 22 varies, the rotation of the primary shaft 12 can be varied continuously and transmitted to the secondary shaft 13. If the winding diameter of the drive belt 22 relative to the primary pulley 20 is Rp and the winding diameter of the drive belt 22 relative to the secondary pulley 21 is Rs, the gear ratio of the continuously variable transmission 10 is Rs/Rp.

To vary the groove width of the primary pulley 20, a plunger 23 is fixed to the primary shaft 12, a primary cylinder 24 that contacts the outer peripheral surface of the plunger 23 slidably is fixed to the movable sheave 20b, and a working fluid chamber 25 is delineated by the plunger 23 and the primary cylinder 24. To vary the groove width of the secondary pulley 21, a plunger 26 is fixed to the secondary shaft 13, a secondary cylinder 27 that contacts the outer peripheral surface of the plunger 26 slidably is fixed to the movable sheave 21b, and a working fluid chamber 28 is delineated by the plunger 26 and the secondary cylinder 27. The groove width of the respective pulleys 20, 21 is set by adjusting a primary pressure Pp serving as a speed change control pressure which is introduced into the primary side working fluid chamber 25, and a secondary pressure Ps serving as a tightening control pressure which is introduced into the secondary side working fluid chamber 28.

To transmit engine power to the primary pulley 20, a torque converter 30 and a forward-reverse switching mechanism 31 are provided between a crankshaft 11a and the primary shaft 12. The torque converter 30 comprises a pump shell 30a linked to the crankshaft 11a and a turbine runner 30b facing the pump shell 30a, and a torque converter shaft 32 is linked to the turbine runner 30b. Further, a lockup clutch 33 for engaging the crankshaft 11a and the torque converter shaft 32 in accordance with running conditions is incorporated into the torque converter 30.

The forward-reverse switching mechanism 31 comprises a double pinion type planetary gear train 34, a forward clutch 35, and a reverse brake 36, and switches the transmission path of the engine power by activating the forward clutch 35 and reverse brake 36. When both the forward clutch 35 and the reverse brake 36 are released, the torque converter shaft 32 and primary shaft 12 are disconnected such that the forward-reverse switching mechanism 31 is switched to a neutral state in which power is not transmitted to the primary shaft 12. When the forward clutch 35 is engaged while the reverse brake 36 is released, the rotation of the torque converter shaft 32 is transmitted to the primary pulley 20 as is. When the reverse brake 36 is engaged while the forward clutch 35 is released, the rotation of the torque converter shaft 32 is reversed and then transmitted to the primary pulley 20.

Figure 2:
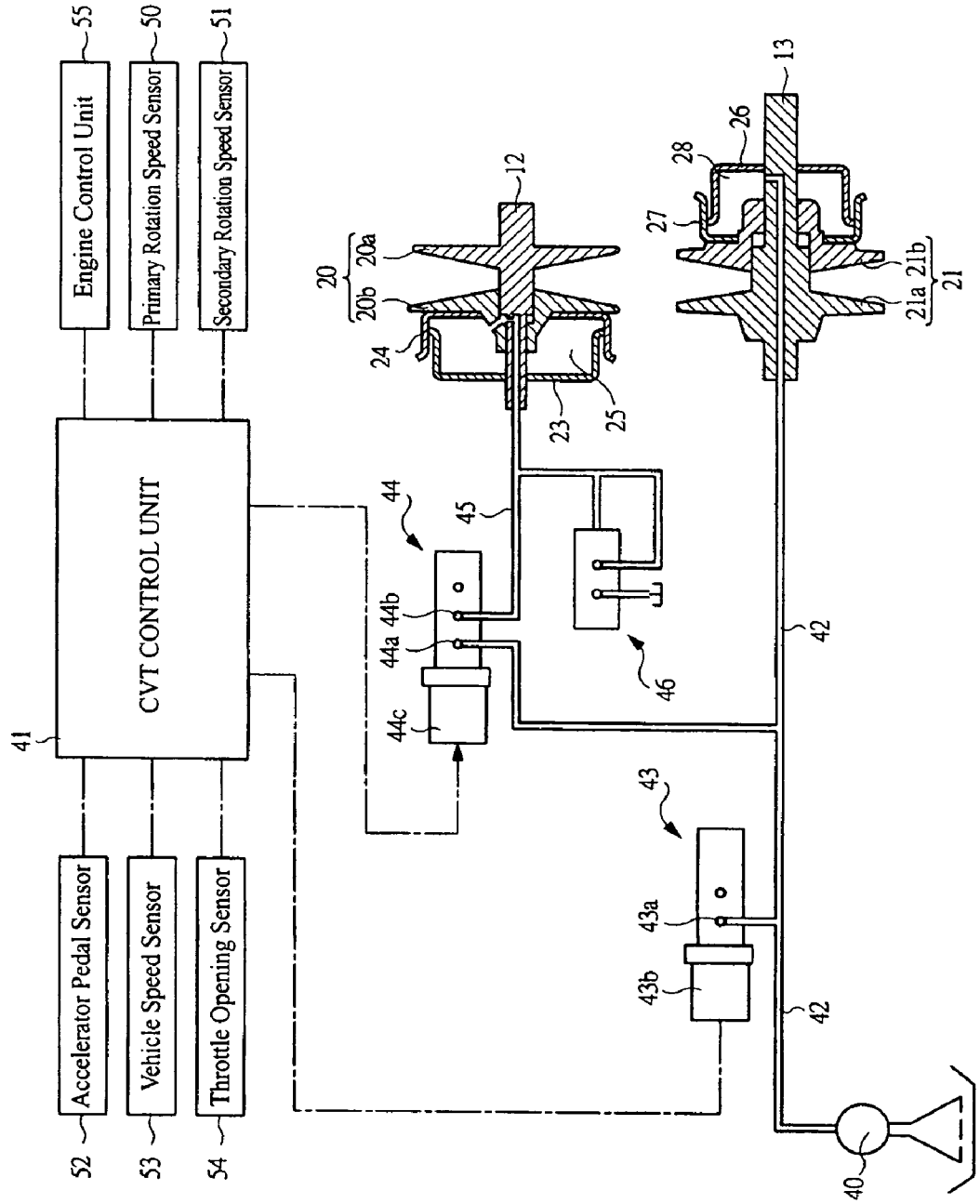
FIG. 2 is a schematic diagram showing a hydraulic control system and an electronic control system of the continuously variable transmission.

FIG. 2 is a schematic diagram showing a hydraulic control system and an electronic control system of the continuously variable transmission 10. As shown in FIG. 2, the continuously variable transmission 10 is provided with an oil pump 40 serving as a hydraulic supply source driven by the engine 11 to supply working fluid to the primary pulley 20 and secondary pulley 21. A secondary pressure passage 42 connected to a discharge port of the oil pump 40 is connected to the working fluid chamber 28 of the secondary pulley 21 and to a pressure adjustment port 43a of a secondary pressure control valve 43 serving as a tightening control valve. A line pressure, or in other words the secondary pressure Ps, adjusted via the secondary pressure control valve 43 is adjusted in accordance with a transmission torque capacity of the drive belt 22 such that slippage does not occur in the drive belt 22. A valve structure in which maximum secondary pressure Ps is output from the secondary pressure control valve 43 when a failure such as a disconnection occurs in the secondary pressure control valve 43 is employed.

Further, the secondary pressure passage 42 is connected to an input port 44a of a primary pressure control valve 44 serving as a speed change control valve, and a primary pressure passage 45 extending from an output port 44b of the primary pressure control valve 44 is connected to the working fluid chamber 25 of the primary pulley 20. The primary pressure Pp adjusted via the primary pressure control valve 44 is adjusted in accordance with a target gear ratio i, the secondary pressure Ps, and so on such that the groove width of the primary pulley 20 is controlled toward the target gear ratio i. Further, a primary pressure-reducing valve 46 is connected to the primary pressure passage 45 to limit the primary pressure Pp so that the primary pressure Pp does not exceed a predetermined upper limit pressure.

Note that the primary pressure Pp is obtained by reducing the secondary pressure Ps. The pressure-receiving area of the working fluid chamber 25 is set to be larger than that of the working fluid chamber 28, and therefore, by controlling the primary pressure Pp, the groove width of the primary pulley 20 can be varied, and the groove width of the secondary pulley 21 can be varied via the drive belt 22. The secondary pressure control valve 43 and the primary pressure control valve 44 are both electromagnetic pressure control valves that can be made to adjust the secondary pressure Ps and primary pressure Pp by controlling a current value supplied to solenoid coils 43b, 44c from a CVT control unit 41.

The CVT control unit 41, which controls the gear ratio of the continuously variable transmission 10 by controlling the groove width of the primary pulley 20 and secondary pulley 21, comprises a microprocessor (CPU), not shown in the drawing. ROM, RAM, and an I/O port are connected to the CPU via a bus line. The ROM stores a control program, various map data, and so on, and the RAM temporarily stores data that have been subjected to calculation processing by the CPU. Detection signals indicating the running conditions of the vehicle are input into the CPU from various sensors via the I/O port.

The various sensors that input detection signals into the CVT control unit 41 include a primary rotation speed sensor 50 for detecting the rotation speed of the primary pulley 20, a secondary rotation speed sensor 51 for detecting the rotation speed of the secondary pulley 21, an accelerator pedal sensor 52 for detecting an accelerator opening, i.e. the stroke of an accelerator pedal, a vehicle speed sensor 53 for detecting a vehicle speed V, and a throttle opening sensor 54 for detecting a throttle opening To of a throttle valve. Further, an engine control unit 55 is connected to the CVT control unit 41 so that the continuously variable transmission 10 and engine 11 are controlled in a coordinated manner.

Figure 3:
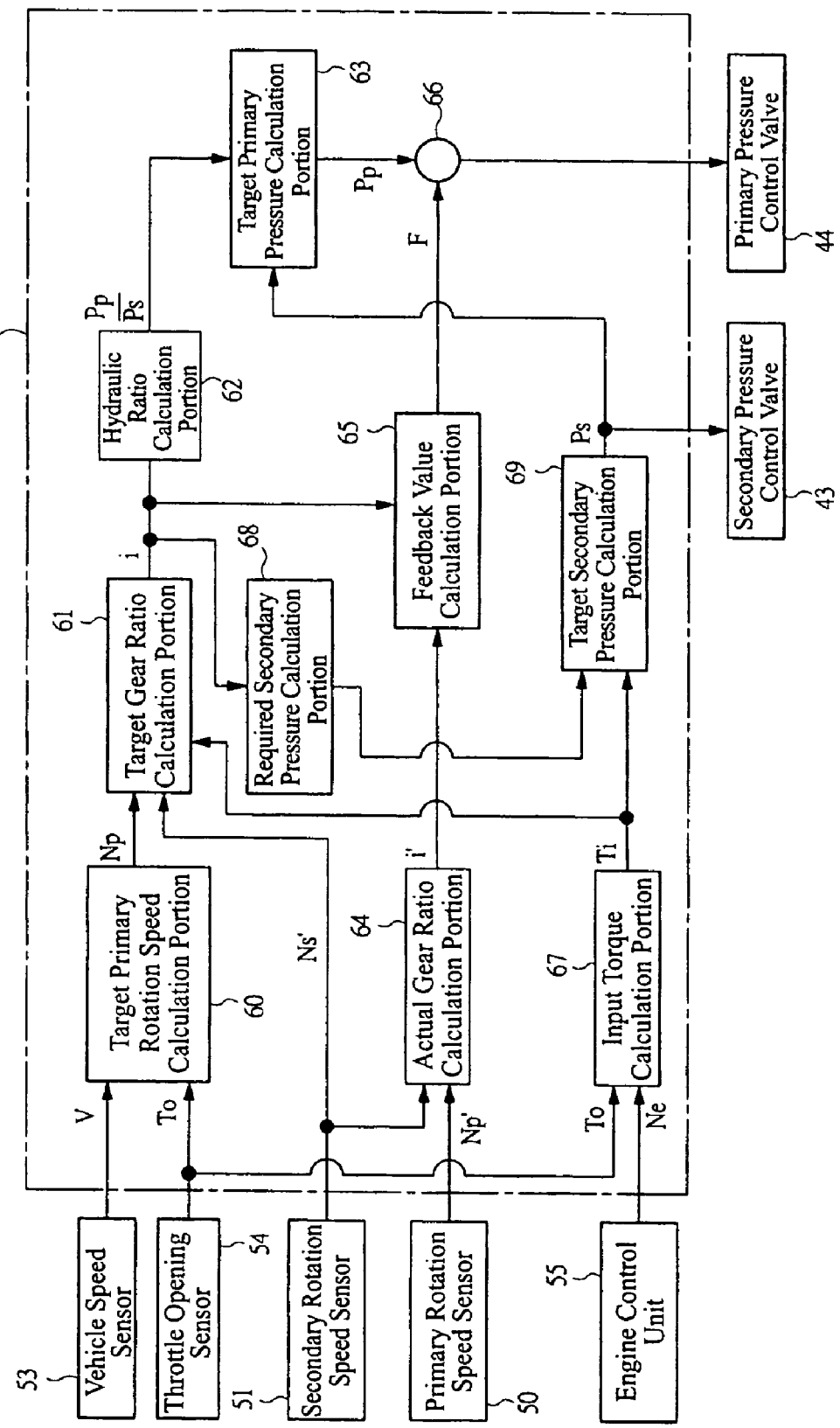
FIG. 3 is a block diagram showing a speed change control system of a CVT control unit.

Speed change control performed on the continuously variable transmission 10 by the CVT control unit 41 will now be described. FIG. 3 is a block diagram showing a speed change control system of the CVT control unit 41. As shown in FIG. 3, to calculate a target primary pressure Pp, the CVT control unit 41 comprises a target primary rotation speed calculation portion 60, a target gear ratio calculation portion 61, a hydraulic ratio calculation portion 62, and a target primary pressure calculation portion 63. The target primary rotation speed calculation portion 60 calculates a target primary rotation speed Np by referring to a speed change characteristic map on the basis of the vehicle speed V and throttle opening To indicating the running conditions of the vehicle, and the target gear ratio calculation portion 61, which serves as target gear ratio calculating means, calculates the target gear ratio i on the basis of the target primary rotation speed Np and an actual secondary rotation speed Ns'. Next, the hydraulic ratio calculation portion 62 calculates a hydraulic ratio (Pp/Ps) between the target primary pressure Pp and a target secondary pressure Ps corresponding to the target gear ratio i, and the target primary pressure calculation portion 63 calculates the target primary pressure Pp by multiplying the target secondary pressure Ps by the hydraulic ratio.

To feedback-control the target primary pressure Pp, the CVT control unit 41 comprises an actual gear ratio calculation portion 64, a feedback value calculation portion 65, and an addition portion 66. The actual gear ratio calculation portion 64, which serves as actual gear ratio calculating means, calculates an actual gear ratio i' on the basis of an actual primary rotation speed Np' and the actual secondary rotation speed Ns', and the feedback value calculation portion 65, which serves as feedback control means, calculates a feedback value F on the basis of the actual gear ratio i' and the target gear ratio i. Next, the feedback value F is added to the target primary pressure Pp in the addition portion 66, and thus the target primary pressure Pp is feedback-controlled. The primary pressure control valve 44 is then controlled toward the feedback-controlled target primary pressure Pp such that the actual gear ratio i' approaches the target gear ratio i.

Further, to calculate the target secondary pressure Ps, the CVT control unit 41 comprises an input torque calculation portion 67, a required secondary pressure calculation portion 68, and a target secondary pressure calculation portion 69. The input torque calculation portion 67 calculates an input torque Ti input into the primary shaft 12 from the engine 11 on the basis of an engine rotation speed Ne and the throttle opening To, and the required secondary pressure calculation portion 68 calculates a required secondary pressure on the basis of the target gear ratio i. The input torque Ti and required secondary pressure are input into the target secondary pressure calculation portion 69, and the target secondary pressure Ps is calculated by the target secondary pressure calculation portion 69. The secondary pressure control valve 43 is then controlled toward the target secondary pressure Ps, whereby the secondary pulley 21 generates a tightening force corresponding to the transmission torque capacity of the drive belt 22.

Figure 4:
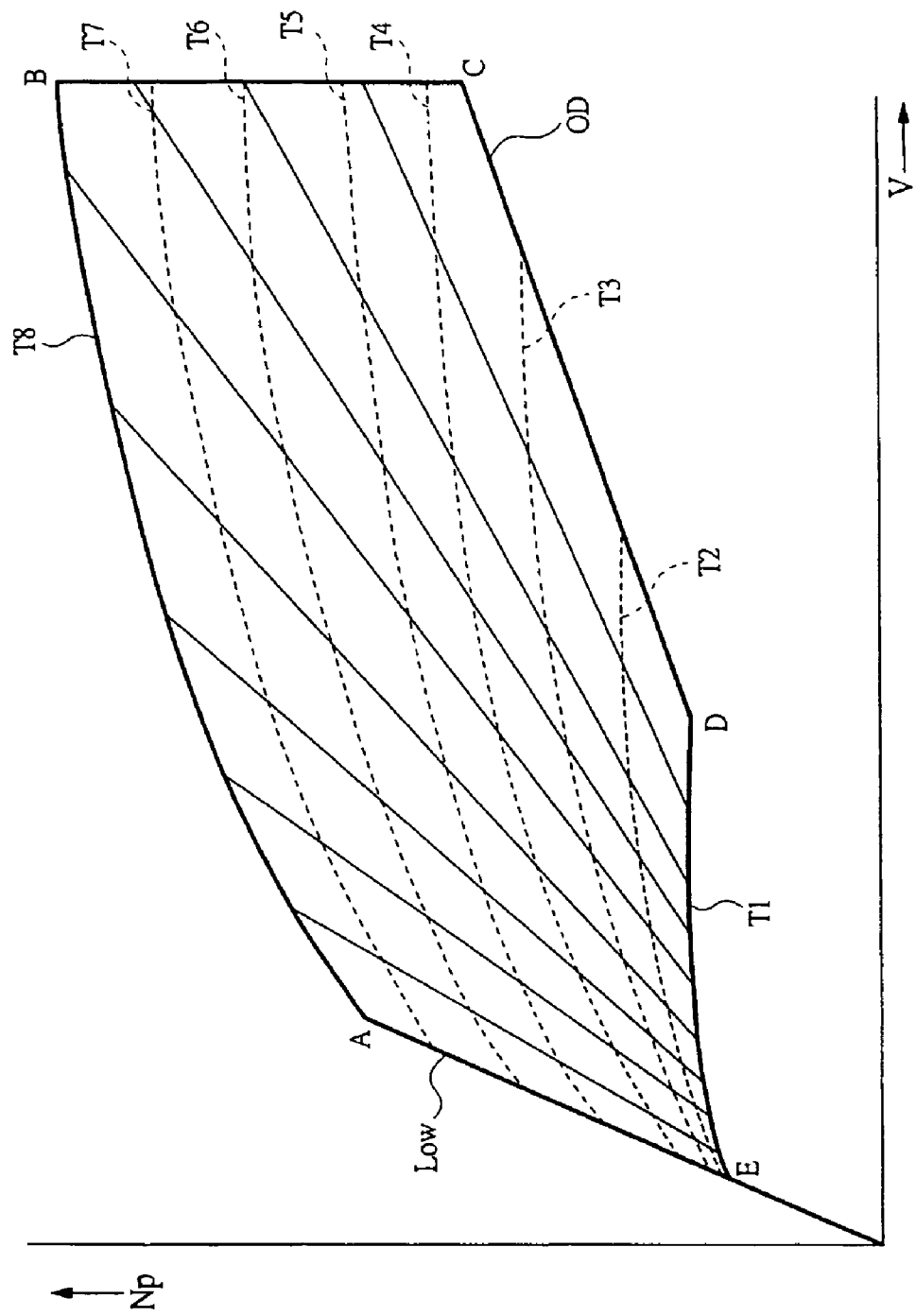
FIG. 4 is a speed change characteristic map referenced when calculating a target primary rotation speed on the basis of a vehicle speed and a throttle opening.

FIG. 4 is a speed change characteristic map (normal speed change map) referenced when calculating the target primary rotation speed Np on the basis of the vehicle speed V and the throttle opening To. As shown in FIG. 4, a characteristic line Low indicating a maximum gear ratio (low state) and a characteristic line OD indicating a minimum gear ratio (overdrive state) are set on the speed change characteristic map, and a plurality of characteristic lines T1 to T8 corresponding to the throttle opening To are set between the characteristic lines Low, OD. When the throttle opening To is low, the target primary rotation speed Np is calculated along the characteristic line T1, and as the throttle opening To steadily increases, the target primary rotation speed Np is calculated along the characteristic lines T2 to T7. When the throttle opening To is fully open, the target primary rotation speed Np is calculated along the characteristic line T8. Further, when the throttle opening To increases in a low vehicle speed region, the target primary rotation speed Np is set along the characteristic line Low, and when the throttle opening To decreases in a high vehicle speed region, the target primary rotation speed Np is set along the characteristic line OD.

For example, when the accelerator pedal is depressed to a fully open state to cause the vehicle to accelerate from a stationary state, the target primary rotation speed Np reaches a point A along the characteristic line Low, whereupon the gear ratio is shifted to the overdrive side and the target primary rotation speed Np is raised to a point B. When the accelerator pedal is released from this state, a speed change is performed to the overdrive side and the target primary rotation speed Np decreases to a point C, after which the target primary rotation speed Np decreases along the characteristic line OD to a point D. The vehicle then stops while maintaining the gear ratio on the low side. Note that during actual travel, the throttle opening To is varied by an operation of a driver, and therefore the target primary rotation speed Np is set appropriately within a setting region indicated by the points A to E in FIG. 4.

Figure 5:
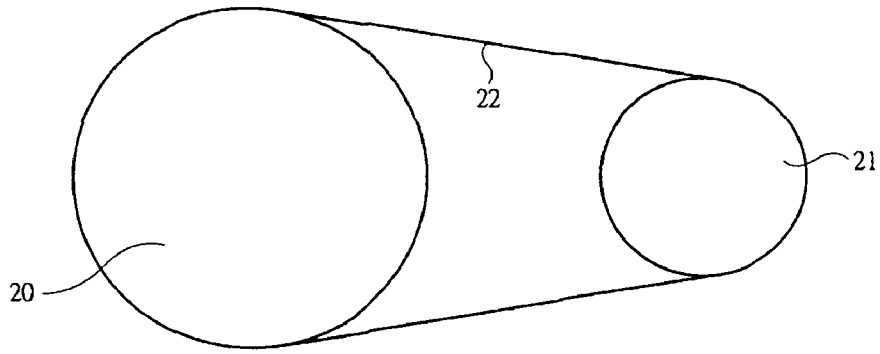
FIGS. 5A and 5B are illustrative views showing speed change conditions when a target gear ratio is set on an overdrive side.
Figure 5:
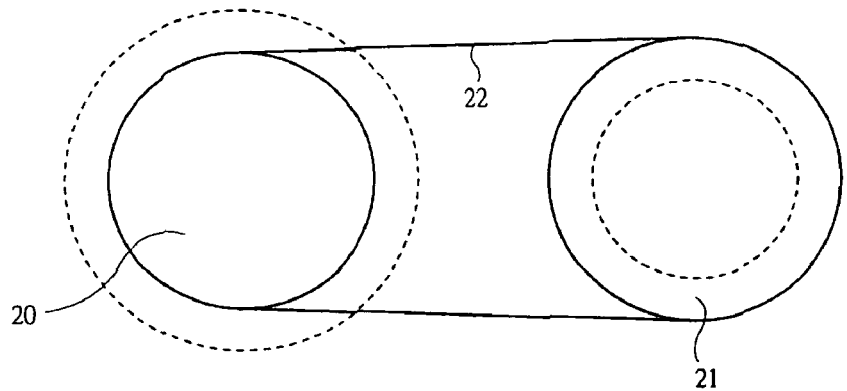

FIGS. 5A and 5B are illustrative views showing speed change conditions when the target gear ratio i is set on the overdrive side. Note that FIG. 5A shows a speed change condition when the secondary pressure control valve 43 is in a normal state, and FIG. 5B shows a speed change condition when a failure occurs in the secondary pressure control valve 43.

First, as shown in FIG. 5A, when the secondary pressure control valve 43 is in a normal state such that the secondary pressure Ps is output in accordance with the input torque Ti and the target gear ratio i, the secondary pressure Ps can be controlled appropriately, and therefore the actual gear ratio i' can be substantially matched to the target gear ratio i. On the other hand, as shown in FIG. 5B, when the secondary pressure control valve 43 is in a state of failure such that the maximum secondary pressure Ps is output regardless of the input torque Ti and target gear ratio i, excessive secondary pressure Ps is output, and as a result, the actual gear ratio i' deviates to the speed reduction side (low side) of the target gear ratio i. Hence, when the secondary pressure control valve 43 enters a state of failure, a downshift is executed such that the actual gear ratio i' shifts to the low side, even though the target gear ratio i has been set on the overdrive side on the basis of the vehicle speed V and the throttle opening To.

As described above, the feedback value calculation portion 65 of the CVT control unit 41 calculates the feedback value F on the basis of the deviation between the actual gear ratio i' and the target gear ratio i. Therefore, as shown in FIG. 5B, when the actual gear ratio i' and the target gear ratio i diverge, the feedback value F is calculated in accordance with the deviation therebetween, and the target primary pressure Pp is feedback-controlled to the overdrive side. However, since excessive secondary pressure Ps is output, the actual gear ratio i' cannot be caused to converge with the target gear ratio i, and as a result, the feedback value F accumulates unnecessarily on the upshift side. When a downshift command is output in this state, downshift operations in the continuously variable transmission are halted until the feedback value F accumulated on the upshift side is expended, and as a result, the responsiveness of the speed change control deteriorates. Moreover, when the vehicle decelerates rapidly, it may be impossible to complete a downshift before the vehicle stops due to the deterioration in responsiveness, and as a result it may be difficult to secure an adequate running performance to restart the vehicle.

Figure 6:
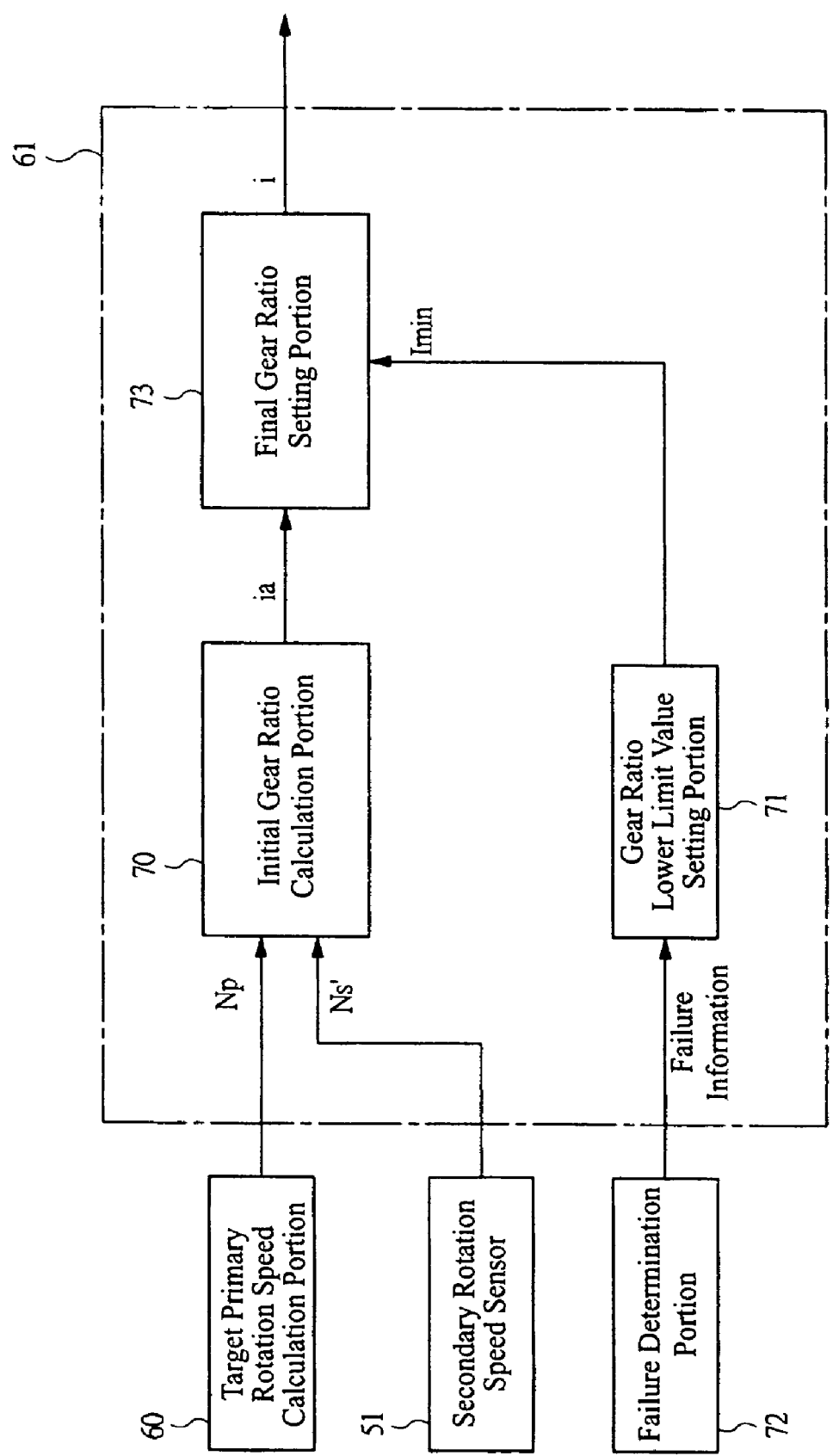
FIG. 6 is a block diagram showing in detail a target gear ratio calculation portion shown in FIG. 3.
Figure 7:
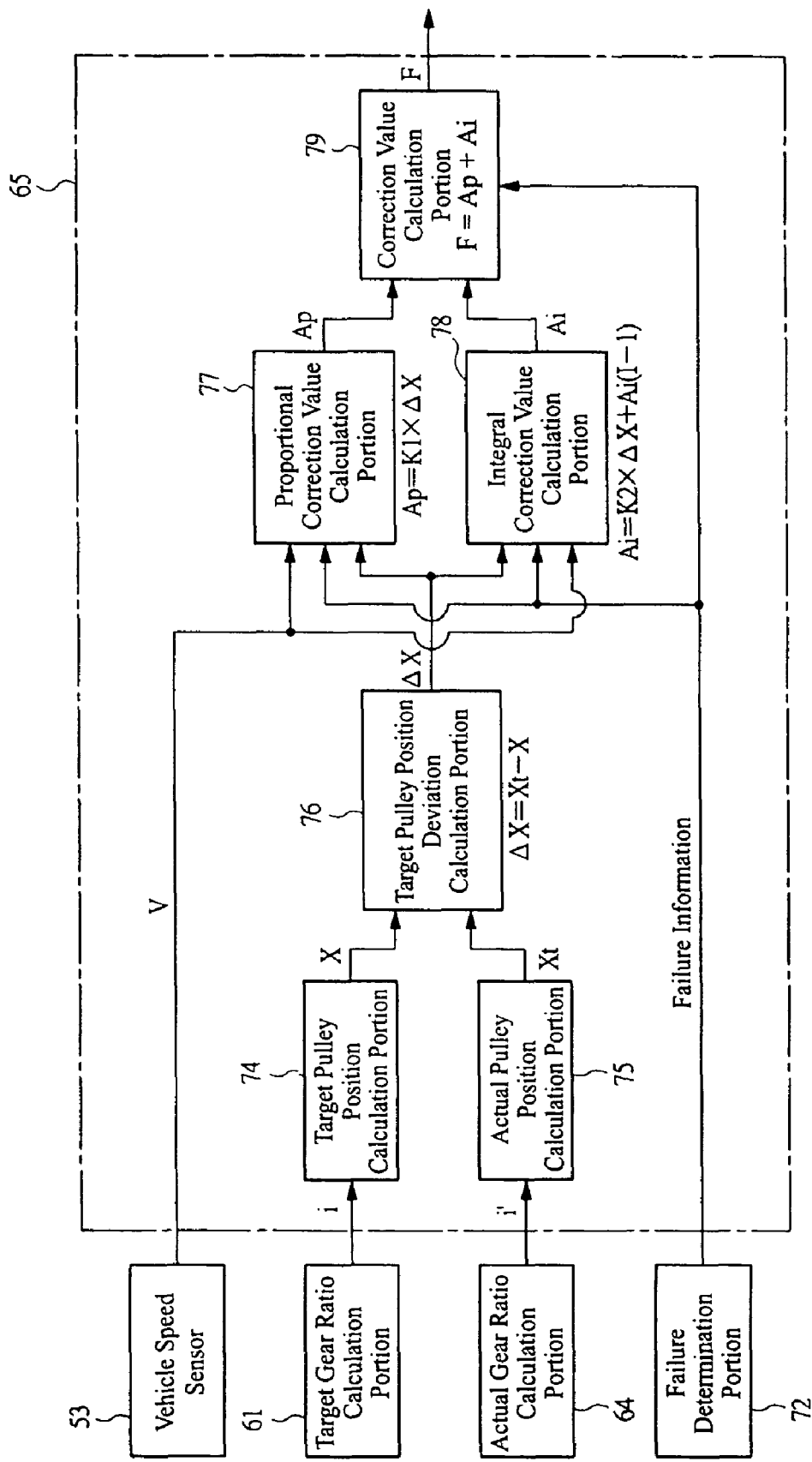
FIG. 7 is a block diagram showing in detail a feedback value calculation portion shown in FIG. 3.

To secure responsiveness during speed change control and provide an adequate running performance to restart the vehicle even when the secondary pressure control valve 43 enters a state of failure, a control device for a continuously variable transmission according to the present invention executes speed change control in the following manner. FIG. 6 is a block diagram showing in detail the target gear ratio calculation portion 61 of FIG. 3, and FIG. 7 is a block diagram showing in detail the feedback value calculation portion 65 of FIG. 3. FIG. 6 shows a process for calculating the target gear ratio i, while FIG. 7 shows a process for calculating the feedback value F. Further, in FIGS. 6 and 7, identical reference symbols have been allocated to sites that are identical to those shown in FIG. 3, and description thereof has been omitted.

As shown in FIG. 6, the target primary rotation speed Np is input into an initial gear ratio calculation portion 70 in the target gear ratio calculation portion 61 from the target primary rotation speed calculation portion 60, and the actual secondary rotation speed Ns' is input into the initial gear ratio calculation portion 70 from the secondary rotation speed sensor 51. The initial gear ratio calculation portion 70 then calculates an initial target gear ratio ia on the basis of the target primary rotation speed Np and the actual secondary rotation speed Ns'. Further, a failure determination portion 72 that functions as failure detecting means is connected to a gear ratio lower limit value setting portion 71 serving as speed change region setting means in the target gear ratio calculation portion 61, and determination information indicating whether or not the secondary pressure control valve 43 is in a state of failure is output from the failure determination portion 72. Note that the failure determination portion 72 determines whether the secondary pressure control valve 43 is in a state of failure or not by comparing an instructed current value and an actual current value of the secondary pressure control valve 43. The gear ratio lower limit value setting portion 71 stores a lower limit value Imin of the target gear ratio i, and when the failure determination portion 72 determines that the secondary pressure control valve 43 is in a state of failure, the lower limit value Imin is output to a final gear ratio setting portion 73 from the gear ratio lower limit value setting portion 71.

Next, the initial target gear ratio ia and the lower limit value Imin are input into the final gear ratio setting portion 73, and a final target gear ratio i is set by the final gear ratio setting portion 73. When the initial target gear ratio ia is determined to be lower than the lower limit value Imin in the final gear ratio setting portion 73, the initial target gear ratio ia is raised to the lower limit value Imin and then set as the target gear ratio i (i=Imin). When the initial target gear ratio ia is determined to be higher than the lower limit value Imin, on the other hand, the initial target gear ratio ia is set as the target gear ratio i (i=ia) as is. In other words, when the secondary pressure control valve 43 fails and the target gear ratio i is set on the overdrive side below the controllable lower limit value Imin, the target gear ratio i is raised to the lower limit value Imin to avoid divergence between the target gear ratio i and the actual gear ratio i'. Needless to say, when the secondary pressure control valve 43 is determined to be in a normal state and the lower limit value Imin is not output from the gear ratio lower limit value setting portion 71, the initial target gear ratio ia is set as the target gear ratio i (i=ia) as is.

Next, as shown in FIG. 7, the target gear ratio i output from the target gear ratio calculation portion 61 is input into a target pulley position calculation portion 74 in the feedback value calculation portion 65, and the actual gear ratio i' output from the actual gear ratio calculation portion 64 is input into an actual pulley position calculation portion 75 in the feedback value calculation portion 65. The pulley position calculation portions 74, 75 each comprise a pulley position conversion map. A target pulley position X of the primary pulley 20 corresponding to the target gear ratio i is calculated by the target pulley position calculation portion 74, and an actual pulley position Xt of the primary pulley 20 corresponding to the actual gear ratio i' is calculated by the actual pulley position calculation portion 75.

To cause the actual pulley position Xt to converge with the target pulley position X, a deviation ΔX between the actual pulley position Xt and the target pulley position X is calculated in a target pulley position deviation calculation portion 76. Next, a proportional correction value calculation portion 77 uses a proportional gain K1 set on the basis of the deviation ΔX to calculate a proportional correction value Ap (Ap=K1×ΔX) by solving an arithmetic equation of a proportional action, and an integral correction value calculation portion 78 uses an integral gain K2 set on the basis of the deviation ΔX to calculate an integral correction value Ai (Ai=(deviation+integral gain)+previous integral correction value=(K2×ΔX)+Ai(I−1)) by solving an arithmetic equation of an integral action. The feedback value F (F=Ap+Ai) is then calculated in a correction value calculation portion 79 on the basis of the proportional correction value Ap and the integral correction value Ai.

The vehicle speed sensor 53 and the failure determination portion 72 are connected to the proportional correction value calculation portion 77, integral correction value calculation portion 78, and correction value calculation portion 79, and therefore, on the basis of the failure information relating to the secondary pressure control valve 43, the feedback value F can be limited by setting the proportional gain K1 or the integral gain K2 to be small, or the feedback value F can be limited by predetermined upper and lower limit values L1, L2. Moreover, the gains K1, K2 and the upper and lower limits L1, L2 can be varied according to the vehicle speed V. Thus, the feedback value calculation portion 65, which functions as speed change speed limiting means, is capable of limiting the speed change speed of the continuously variable transmission 10 during failure of the secondary pressure control valve 43.

Figure 8:
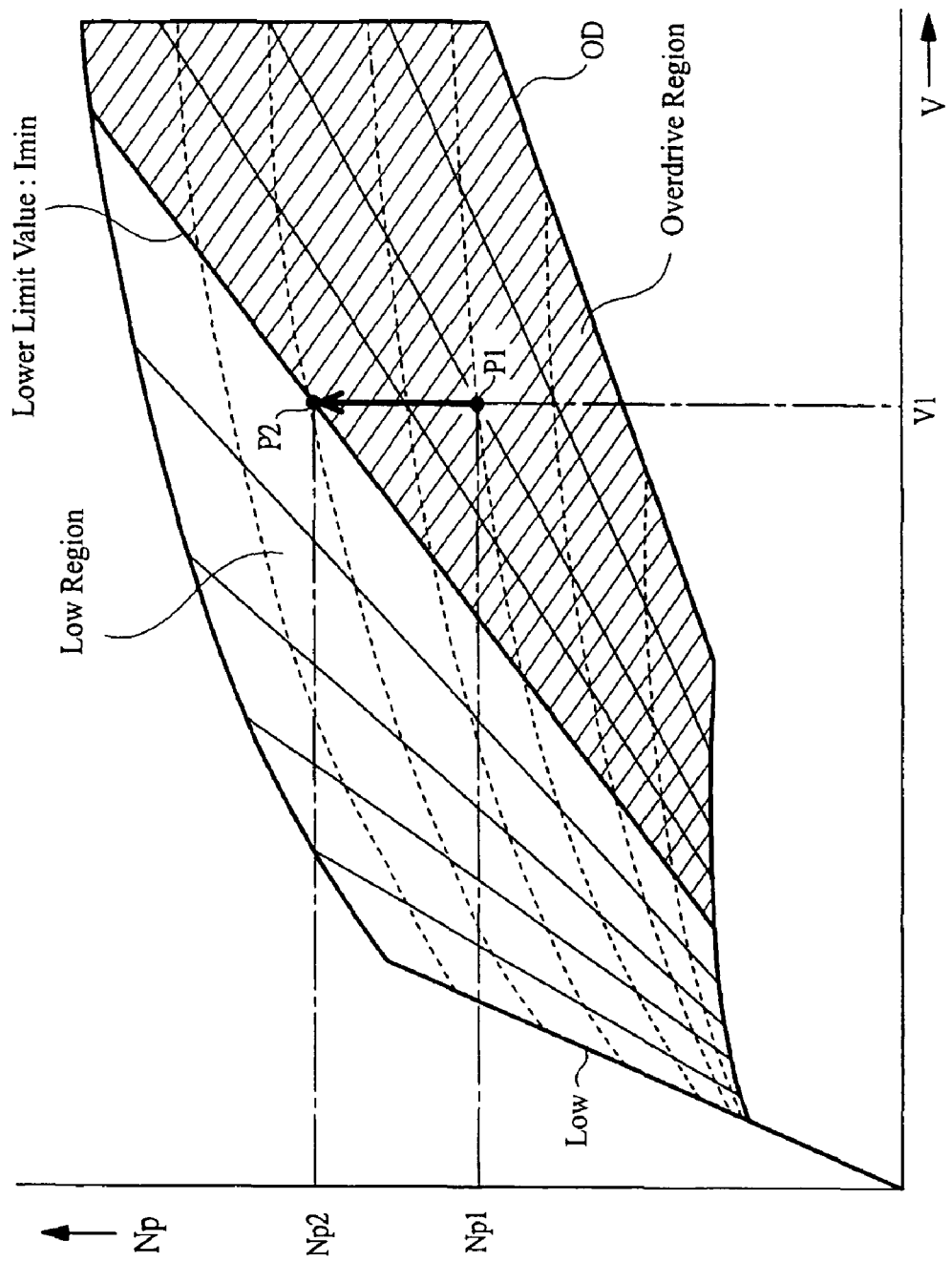
FIG. 8 is an illustrative view showing a speed change control method employed during failure of a secondary pressure control valve.

FIG. 8 is an illustrative view showing a speed change control method employed during failure of the secondary pressure control valve 43. As shown in FIG. 8, when the secondary pressure control valve 43 enters a state of failure and the actual gear ratio i' has been controlled to the overdrive side (P1), the target primary rotation speed Np is raised from Np1 to Np2 to raise the target gear ratio i to a lower limit value Imin, enabling control thereof even during a failure. In other words, when the secondary pressure control valve 43 fails, the actual gear ratio i' cannot be controlled within an overdrive region that is lower than the lower limit value Imin, and therefore, by limiting the setting region of the target gear ratio i to a low region that is higher than the lower limit value Imin, the deviation between the target gear ratio i and the actual gear ratio i' is eliminated. Thus, the feedback value F does not accumulate unnecessarily, and therefore the responsiveness of the speed change control can be secured and a downshift can be completed to a low state during deceleration.

Further, as shown in FIG. 7, during failure of the secondary pressure control valve 43, the feedback value calculation portion 65 sets the proportional gain K1 and the integral gain K2 to be small in order to limit the feedback value F or limits the feedback value F using the predetermined upper and lower limit values L1, L2, and therefore the generation of an excessive feedback value F can be suppressed. As a result, the speed change speed during a failure can be suppressed, and speed change shock caused by a sudden shift in the gear ratio can be suppressed. Furthermore, the gains K1, K2 and the upper and lower limits L1, L2 are varied according to the vehicle speed, and therefore the feedback value F can be reduced at a high vehicle speed in order to reduce the speed change speed, and the feedback value F can be increased at a low vehicle speed in order to increase the speed change speed. Furthermore, when the target gear ratio i and the actual gear ratio i' diverge, the integral correction value Ai accumulates. During a failure, however, unnecessary accumulation can be avoided by reducing the integral gain K2 and speed change responsiveness can be ensured by increasing the proportional gain K1. Moreover, during vehicle deceleration, the gear ratio tends to shift easily to the low side, but unnecessary downshifts can be limited by limiting the speed change speed during vehicle deceleration.

Figure 9:
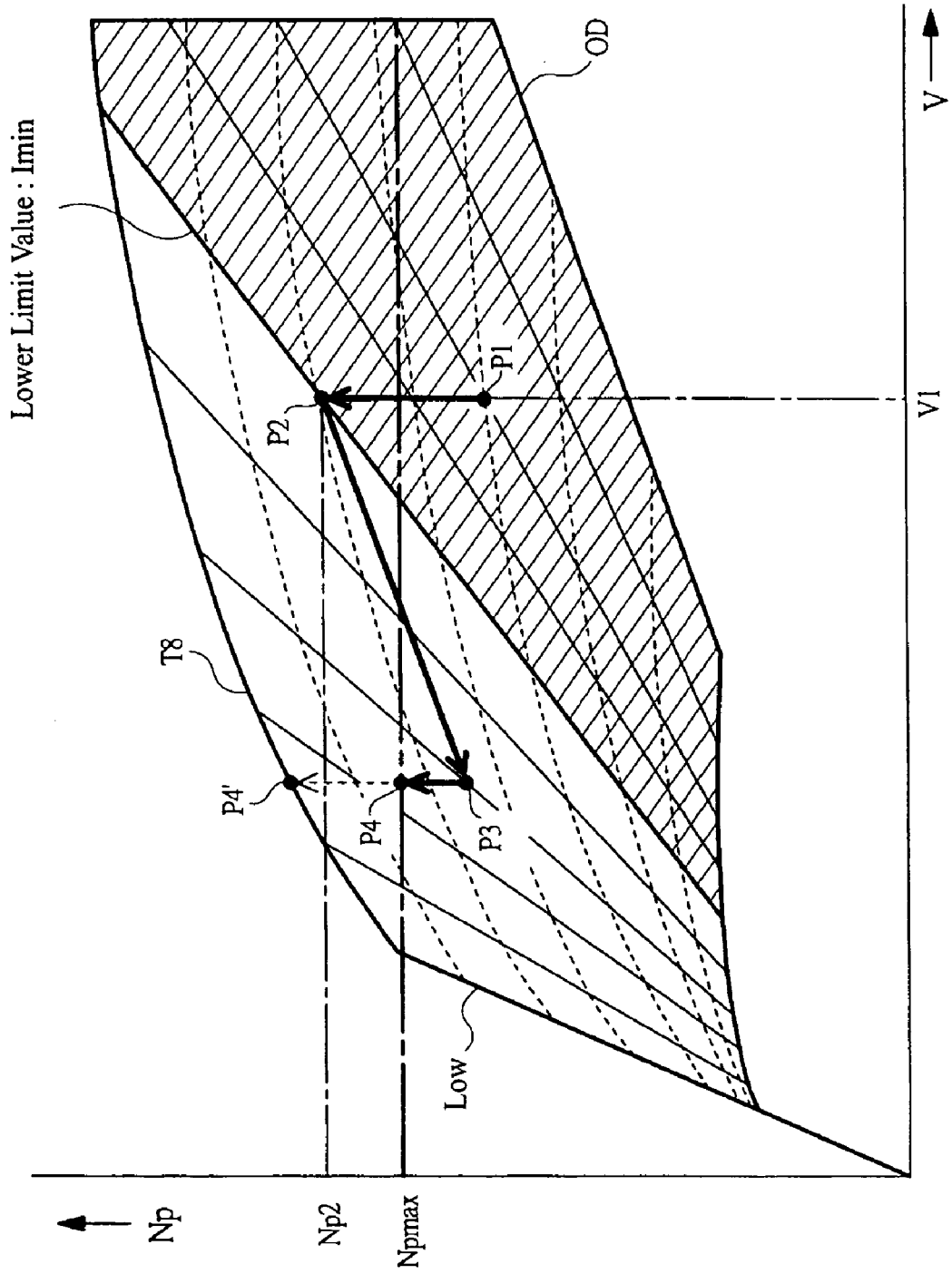
FIG. 9 is an illustrative view showing another speed change control method employed during failure of the secondary pressure control valve.

In the above description, the setting region of the target gear ratio i is limited to a predetermined low region by raising the lower limit value Imin of the target gear ratio i, but the present invention is not limited thereto, and an upper limit value of the target primary rotation speed Np may be set by the target primary rotation speed calculation portion 60 functioning as rotation speed setting means. FIG. 9 is an illustrative view showing another speed change control method employed during failure of the secondary pressure control valve 43. As shown in FIG. 9, when the secondary pressure control valve 43 enters a state of failure after the actual gear ratio i' has been controlled to the overdrive side (P1), the target primary rotation speed Np is raised from Np1 to Np2, as described above. Then, after the target primary rotation speed Np set on the basis of the throttle opening To and the vehicle speed V has fallen below a predetermined upper limit value Npmax, the target primary rotation speed Np is set so as not to exceed the upper limit value Npmax. For example, the target primary rotation speed Np is set so as not to exceed the upper limit value Npmax (P4) even when the throttle opening To reaches T8 (P4') as the accelerator pedal is depressed after the target primary rotation speed Np has fallen below the upper limit value Npmax (P3). By suppressing the target primary rotation speed Np following failure of the secondary pressure control valve 43 in this manner, the continuously variable transmission 10 can be protected effectively when in a state of failure. Immediately after the failure, the target primary rotation speed Np is set in excess of the upper limit value Npmax. The reason for this is that if the target primary rotation speed Np is suddenly set at or below the upper limit value Npmax, speed change shock may occur.

Figure 10:
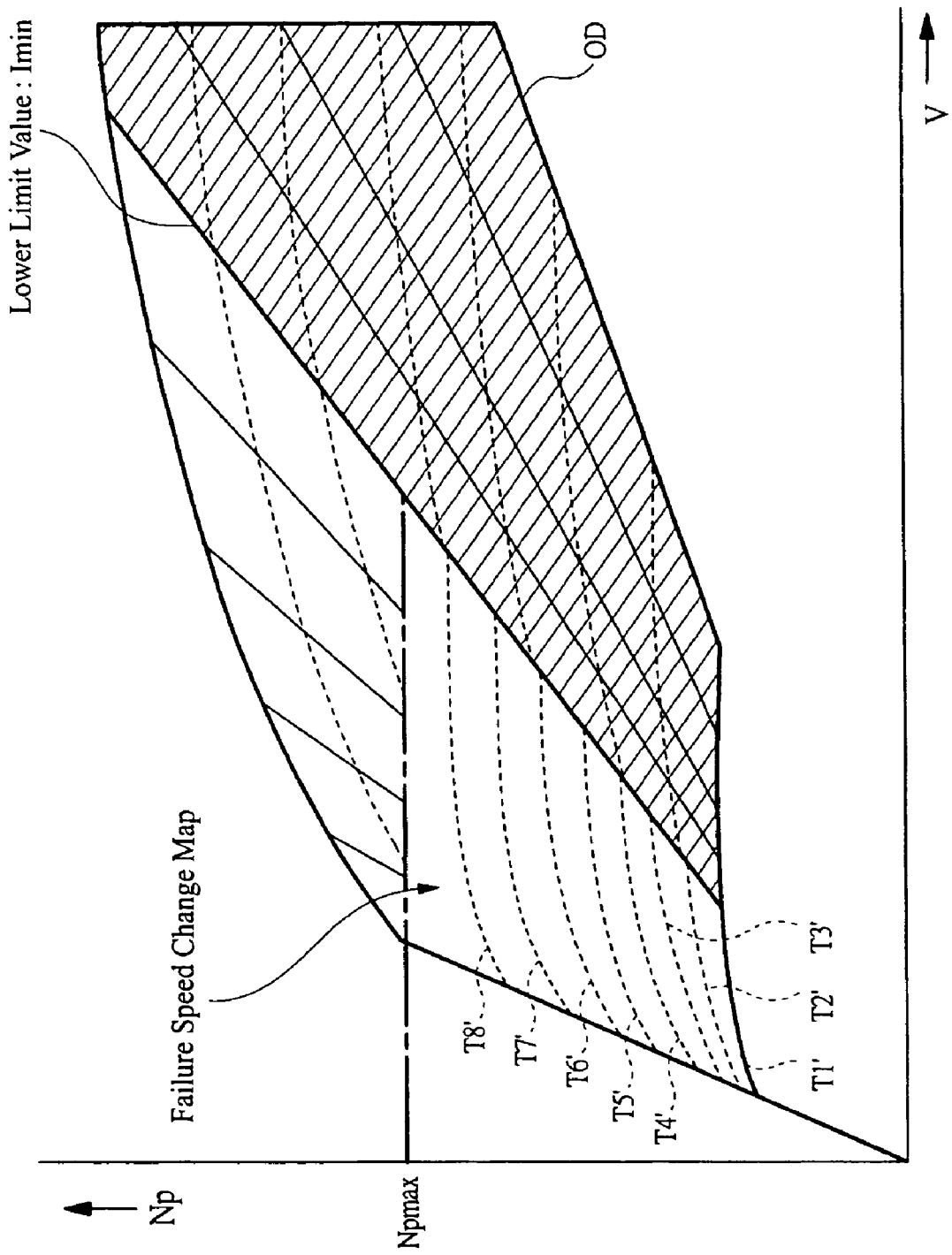
FIG. 10 is an illustrative view showing a speed change map for use during a failure.

Further, if the setting region of the target gear ratio i is simply limited following failure of the secondary pressure control valve 43, it becomes difficult to set the target gear ratio i appropriately in accordance with the throttle opening To, and therefore, in addition to the normal speed change map used when the secondary pressure control valve 43 is in a normal state, a failure speed change map for use when the secondary pressure control valve 43 fails may also be set. FIG. 10 is an illustrative view of a speed change map for use during a failure. As shown in FIG. 10, characteristic lines T1' to T8' corresponding to throttle openings To ranging from fully closed to fully open are set within a setting region in which the target gear ratio i is to be set following failure of the secondary pressure control valve 43. When this type of failure speed change map is employed, the target primary rotation speed Np can be set appropriately in accordance with the throttle opening To. Furthermore, the speed change timing differs from that of a normal state, and therefore the driver can be made aware that the vehicle has entered a state of failure.

The present invention is not limited to the embodiment described above, and may of course be subjected to various modifications within a scope that does not depart from the spirit thereof. For example, in the drawings, the secondary pressure control valve 43 also functions as a line pressure control valve, but the present invention is not limited thereto, and a line pressure control valve for adjusting a line pressure PL supplied to another hydraulic operation portion and a secondary pressure control valve for adjusting the line pressure PL to the secondary pressure Ps may be provided separately.

Further, the primary pulley 20 is caused to function as a speed change pulley while the secondary pulley 21 is caused to function as a tightening pulley. However, the present invention is not limited thereto, and the primary pulley 20 may be caused to function as a tightening pulley while the secondary pulley 21 is caused to function as a speed change pulley. In this case, the primary pressure control valve 44 functions as a tightening control valve and the secondary pressure control valve 43 functions as a speed change control valve.

Further, if the primary pressure control valve 44 functioning as a tightening control valve enters a state of failure when the primary pulley 20 is caused to function as a tightening pulley and the secondary pulley 21 is caused to function as a speed change pulley, excessive primary pressure Pp is output such that the actual gear ratio i' is controlled to the overdrive side. During this type of failure, the setting region for setting the target gear ratio i is limited to the overdrive side by lowering the upper limit value of the target gear ratio i to the overdrive side. In so doing, divergence between the target gear ratio i and actual gear ratio i' can be eliminated, and unnecessary accumulation of the feedback value F can be avoided.

What is claimed is:

1. A control device for a continuously variable transmission having a speed change pulley and a tightening pulley around which a power transmission element is wound, comprising:
   a speed change control valve provided between a hydraulic supply source and said speed change pulley for adjusting a speed change control pressure supplied to said speed change pulley;
   a tightening control valve provided between said hydraulic supply source and said tightening pulley for adjusting a tightening control pressure supplied to said tightening pulley;
   target gear ratio setting means for setting a target gear ratio on the basis of a running condition;
   actual gear ratio calculating means for calculating an actual gear ratio on the basis of a rotation speed of said speed change pulley and said tightening pulley;
   feedback control means for feedback-controlling said speed change control pressure on the basis of a deviation between said target gear ratio and said actual gear ratio;
   failure detecting means for detecting failure of said tightening control valve; and
   speed change region setting means for limiting a setting region of said target gear ratio during failure of said tightening control valve so as to set the target gear ratio to the value achievable as the actual gear ratio.

2. The control device for a continuously variable transmission according to claim 1, wherein said speed change pulley is a primary pulley provided on an input shaft, said tightening pulley is a secondary pulley provided on an output shaft, and said speed change region setting means raise a lower limit value of said target gear ratio to a speed reduction side during failure of said tightening control valve.

3. The control device for a continuously variable transmission according to claim 2, further comprising rotation speed setting means for lowering an upper limit value of a target primary rotation speed during failure of said tightening control valve.

4. The control device for a continuously variable transmission according to claim 1, wherein said target gear ratio setting means comprise a normal speed change map used when said tightening control valve is in a normal state, and a failure speed change map used during failure of said tightening control valve.

5. The control device for a continuously variable transmission according to claim 1, wherein said tightening control valve outputs a maximum tightening control pressure during failure.

6. The control device for a continuously variable transmission according to claim 1, further comprising speed change speed limiting means for limiting a speed change speed during failure of said tightening control valve.

7. The control device for a continuously variable transmission according to claim 6, wherein said speed change speed limiting means limit said speed change speed in accordance with a vehicle speed.

8. A control device for a continuously variable transmission having a speed change pulley and a tightening pulley around which a power transmission element is wound, comprising:
   a speed change control valve provided between a hydraulic supply source and said speed change pulley for adjusting a speed change control pressure supplied to said speed change pulley;
   a tightening control valve provided between said hydraulic supply source and said tightening pulley for adjusting a tightening pulley for adjusting a tightening control pressure supplied to said tightening pulley;

target gear ratio setting means for setting a target gear ratio on the basis of a running condition;

actual gear ratio calculating means for calculating an actual gear ratio on the basis of a rotation speed of said speed change pulley and said tightening pulley;

feedback control means for feedback-controlling said speed change control pressure on the basis of a deviation between said target gear ratio and said actual gear ratio;

failure detecting means for detecting failure of said tightening control valve;

lower limit value setting means for setting a lower limit value of said target gear ratio during failure of said tightening control valve; and speed change region setting means for raising said target gear ratio to said lower limit value when said target gear ratio is lower than said lower limit value.

9. A control device for a continuously variable transmission according to claim 8, wherein said lower limit value setting means sets said lower limit value to the value achievable as the actual gear ratio.

10. The control device for a continuously variable transmission according to claim 8 wherein said feedback control means is in communication with said failure detecting means and, upon determination of a failure mode, further limits a feedback value output of said feedback means as compared to an output generated during a non-failure mode.

11. The control device for a continuously variable transmission according to claim 8 wherein said speed change setting means, in raising said target gear ratio to said lower limit, raises a target primary rotation speed of said speed change pulley to a first value, and then adjusts said target primary rotation speed to a different, second value.

12. The control device for a continuously variable transmission according to claim 11 wherein said second value is less than the first value.

* * * * *